(12) United States Patent
Tanaka

(10) Patent No.: US 10,173,536 B2
(45) Date of Patent: Jan. 8, 2019

(54) CONTROL DEVICE FOR FUEL CELL VEHICLE

(71) Applicant: NISSAN MOTOR CO., LTD., Yokohama-shi, Kanagawa (JP)

(72) Inventor: Daiki Tanaka, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/747,904

(22) PCT Filed: Jul. 28, 2015

(86) PCT No.: PCT/JP2015/071337
§ 371 (c)(1),
(2) Date: Jan. 26, 2018

(87) PCT Pub. No.: WO2017/017781
PCT Pub. Date: Feb. 2, 2017

(65) Prior Publication Data
US 2018/0215273 A1     Aug. 2, 2018

(51) Int. Cl.
*B60L 11/18* (2006.01)
*H01M 8/04* (2016.01)
(Continued)

(52) U.S. Cl.
CPC ............. *B60L 11/1814* (2013.01); *B60L 7/16* (2013.01); *B60L 11/1851* (2013.01); *B60L 11/1881* (2013.01); *B60L 11/1883* (2013.01); *B60L 11/1887* (2013.01); *B60L 11/1892* (2013.01); *H01M 8/04* (2013.01);
(Continued)

(58) Field of Classification Search
CPC .... B60L 11/1814; B60L 7/16; B60L 11/1851; B60L 11/1881; B60L 11/1883; B60L 11/1887; B60L 11/1892; B60L 2210/10; B60L 2240/36; H01M 8/04; H01M 8/04022; H01M 8/04067; H01M 8/04097; H01M 8/04626; H01M 8/04932;
(Continued)

(56) References Cited

U.S. PATENT DOCUMENTS

2005/0233192 A1   10/2005   Ishikawa et al.
2008/0136359 A1   6/2008    Chung et al.
(Continued)

FOREIGN PATENT DOCUMENTS

JP   2003-324853 A   11/2003
JP   2005-57841 A    3/2005
(Continued)

*Primary Examiner* — Fadey S. Jabr
*Assistant Examiner* — Paula L Schneider
(74) *Attorney, Agent, or Firm* — Foley & Lardner LLP

(57) ABSTRACT

An electricity converter for controlling an output of the fuel cell, a battery for storing electricity of the fuel cell, and a load device that operates by electricity of at least one of the fuel cell or the battery are included. Further provided is a controller that calculates current chargeable electricity of the battery, load device electricity currently consumed by the load device and current generable electricity of the fuel cell, and decreases the output of the fuel cell by the electricity converter when the generable electricity is equal-to or more-than a combined value of the chargeable electricity and the load device electricity.

11 Claims, 12 Drawing Sheets

(51) Int. Cl.
    *H02J 7/00* (2006.01)
    *H02J 7/34* (2006.01)
    *B60L 7/16* (2006.01)
    *H01M 8/04014* (2016.01)
    *H01M 8/04007* (2016.01)
    *H01M 8/04089* (2016.01)
    *H01M 8/04537* (2016.01)
    *H01M 8/04858* (2016.01)
    *H01M 8/04992* (2016.01)
    *H02J 1/00* (2006.01)

(52) U.S. Cl.
    CPC ... *H01M 8/04022* (2013.01); *H01M 8/04067* (2013.01); *H01M 8/04097* (2013.01); *H01M 8/04626* (2013.01); *H01M 8/04932* (2013.01); *H01M 8/04992* (2013.01); *H02J 7/00* (2013.01); *H02J 7/34* (2013.01); *B60L 2210/10* (2013.01); *B60L 2240/36* (2013.01); *H01M 2250/20* (2013.01); *H02J 2001/004* (2013.01)

(58) Field of Classification Search
    CPC .. H01M 8/04992; H01M 2250/20; H02J 7/00; H02J 7/34; H02J 2001/004
    USPC .......................................................... 701/22
    See application file for complete search history.

(56) References Cited

U.S. PATENT DOCUMENTS

2010/0112387 A1* 5/2010 Nagasawa ................. B60L 3/00
    429/413
2012/0109444 A1 5/2012 Umayahara

FOREIGN PATENT DOCUMENTS

JP          5336791 B2   11/2013
JP        2014-212655 A  11/2014

* cited by examiner

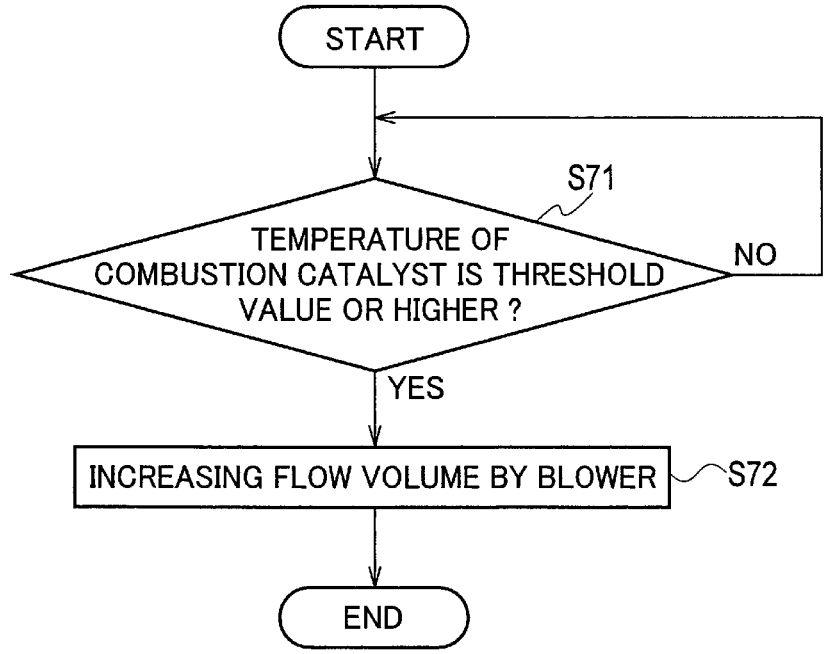
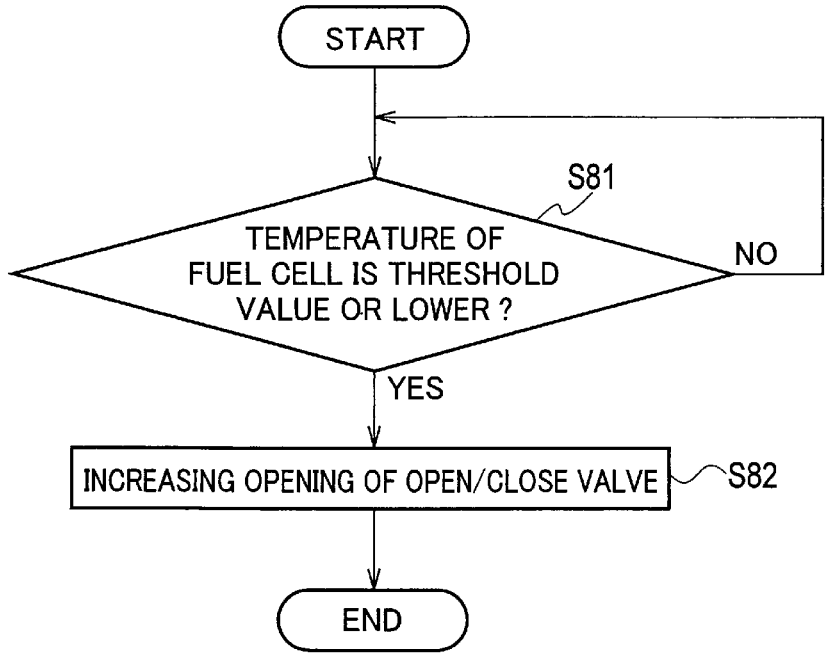

US 10,173,536 B2

CONTROL DEVICE FOR FUEL CELL VEHICLE

TECHNICAL FIELD

The present invention relates to a control device for a fuel cell vehicle that includes an electricity converter for controlling an output of a fuel cell, a battery for storing electricity of the fuel cell, and a load device operated by electricity of the fuel cell.

BACKGROUND ART

Technology of a Patent Literature 1 includes a charge detector that detects charging/discharging electric current of a battery, and decreases an output of a voltage converter when an output of the voltage converter connected with a fuel cell overcharges the battery.

CITATION LIST

Prior-Art Literature

Patent Literature 1: Japanese Granted Patent Publication No. 5336791

SUMMARY OF INVENTION

Problems to be Solved by Invention

The technology of the Patent Literature 1 restricts the output of the voltage converter by a feedback control based on detected information of the charging/discharging electric current generated at the battery. Therefore, a control response delays, and then it is concerned that a transient overcharge may happen to the battery.

Therefore, the present invention intends to restrict a transient overcharge of a battery.

Means for Solving Problems

The present invention includes a fuel cell, a battery and a load device that operates by electricity of the fuel cell, and decreases an output of the fuel cell by an electricity converter when generable electricity of the fuel cell is equal-to or more-than a combined value of chargeable electricity of the battery and load device electricity consumed by the load device.

Effects by Invention

According to the present invention, it is preliminarily confirmed that the generable electricity of the fuel cell is equal-to or more-than the combined value of the chargeable electricity of the battery and the load device electricity consumed by the load device, and then the output of the fuel cell is decreased by the electricity converter. Therefore, the battery can be restricted from being transiently overcharged before being affected by the load device.

BRIEF DESCRIPTION OF DRAWINGS

FIG. 6 is a flowchart showing operation processes of the practical example 1 of FIG. 5.

FIG. 7 is a flowchart showing other operation processes of the practical example 1 of FIG. 5.

DESCRIPTION OF EMBODIMENTS

Hereinafter, an embodiment(s) for carrying out the present invention will be described in detail with reference to the drawings.

Figure 1:
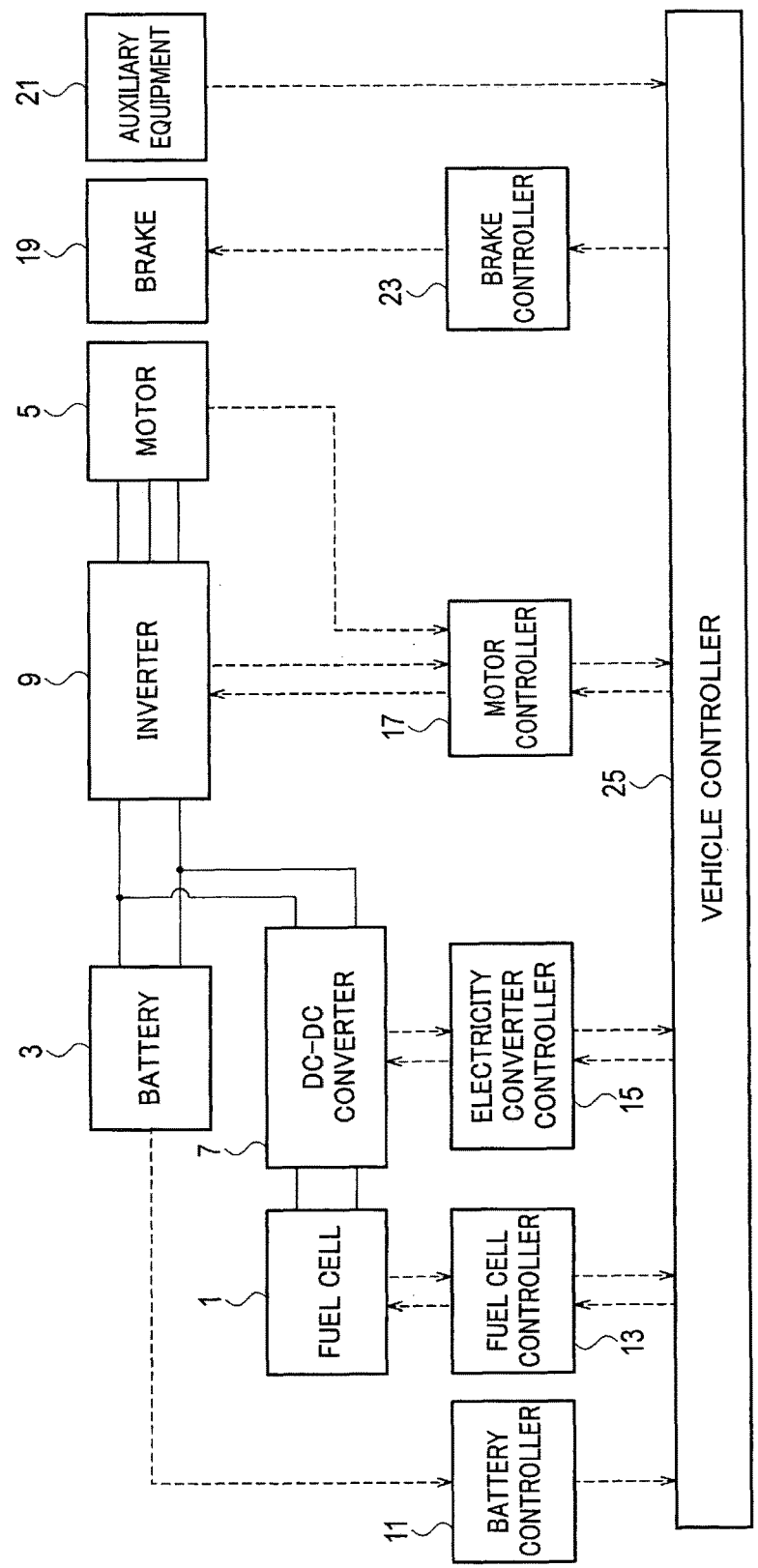
FIG. 1 is an overall configuration diagram of a control device for a fuel cell vehicle according to an embodiment of the present invention.

A control device for a fuel cell vehicle shown in FIG. 1 is applied to a vehicle, e.g. an automobile or the like, and includes a fuel cell 1 and a battery 3 as sources of electricity and a three-phase AC motor (hereinafter, merely referred as the motor) 5 as a drive source for driving the vehicle.

The fuel cell 1 is a solid oxide fuel cell, and generates electricity by being supplied with fuel and air. The electricity generated by the fuel cell 1 is electrically converted by a DC-DC converter 7. A DC voltage output from the DC-DC converter 7 and the battery 3 is electrically inverted to an AC voltage by an inverter 9, and then supplied to the motor 5. The DC-DC converter 7 configures an electricity converter that controls an output of the fuel cell.

A battery controller 11 is connected to the battery 3. The battery controller 11 continuously monitors temperature and a charge level (current, voltage) of the battery 3, and calculates its chargeable electricity and its dischargeable electricity. For example, the battery controller 11 judges that the chargeable electricity reduces notably in view of a total capacity when the battery 3 is at low temperature equal-to or lower-than certain temperature or in a state where its charge level is high and closer to its full-charge.

A fuel cell controller 13 is connected to the fuel cell 1. The fuel cell controller 13 continuously monitors temperature, voltage and current of the fuel cell 1, and controls its temperature and its electricity generated. For example, the fuel cell controller 13 increases temperature of the fuel cell 1 at its start-up by heating air supplied to an air electrode of the fuel cell 1 by using a start-up burner, and forcibly cools the fuel cell 1 at its shut-down by using a blower.

Further, the fuel cell controller 13 controls electricity generated and temperature of the fuel cell 1 by adjusting a fuel flow input to a fuel electrode and an air flow input to an air electrode at electricity generation in the fuel cell 1.

An electricity converter controller 15 is connected to the DC-DC converter 7. The electricity converter controller 15 controls power electronics of the DC-DC converter 7 so as to make outputs (current, voltage) from the fuel cell 1 to the DC-DC converter 7 input to the motor 5 via the inverter 9 and make them charged in the battery 3.

A motor controller 17 is connected to the motor 5 and the inverter 9. The motor controller 17 controls power electronics of the inverter 9 so as to drive the motor 5 according to required acceleration/deceleration of the vehicle.

In addition, the control device for a fuel cell vehicle includes a brake(s) 19 for carrying out braking on a running vehicle, and an auxiliary equipment(s) 21 such as an air-conditioner and a heater. A brake controller 23 is connected to the brake 19. The brake controller 23 controls the brake 19, during braking a vehicle by the brake 19, so as to complement deceleration deficient at generation of regenerative electricity by the motor 5.

The battery controller 11, the fuel cell controller 13, the electricity converter controller 15, the motor controller 17 and the brake controller 23 mentioned above are connected to a vehicle controller 25 that serves as a controller. The vehicle controller 25 receives inputs of various data from the battery controller 11, the fuel cell controller 13, the electricity converter controller 15 and the motor controller 17, and then controls the fuel cell controller 13, the electricity converter controller 15, the motor controller 17 and the brake controller 23.

The auxiliary equipment 21 configures a load device together with the motor 5, and the vehicle controller 25 receives, from the auxiliary equipment 21, an input of electricity (load) consumed while the auxiliary equipment 21 is driven.

The vehicle controller 25 continuously receives following inputs.
(1) Generable electricity C of the fuel cell 1 that is calculated by the fuel cell controller 13 based on the temperature of the fuel cell 1
(2) Chargeable electricity A of the battery 3 that is calculated by the battery controller 11 based on the charge level and the temperature of the battery 3
(3) Output electricity (load), including regenerative electricity, of the motor 5 calculated by the motor controller 17
(4) Output electricity (load) of the auxiliary equipment 21
(5) Target value of the required acceleration/deceleration of the vehicle The above-indicated (3) and (4) correspond to drive electricity B needed for driving the load device such as the motor 5 and the auxiliary equipment 21. The drive electricity for the motor 5 takes a negative (minus) value while the motor 5 generates regenerative electricity.

The vehicle controller 25 receives the above-mentioned inputs of various information, and then calculates a target output of the fuel cell 1, a target output of the DC-DC converter 7, a target output of the motor 5 and a target braking output of the brake 19 to output them to the controllers 13, 15, 17 and 23, respectively.

Next, operation processes of a control method by using the vehicle controller 25 will be described based on flowcharts shown in FIG. 2 and FIG. 3.

Figure 2:
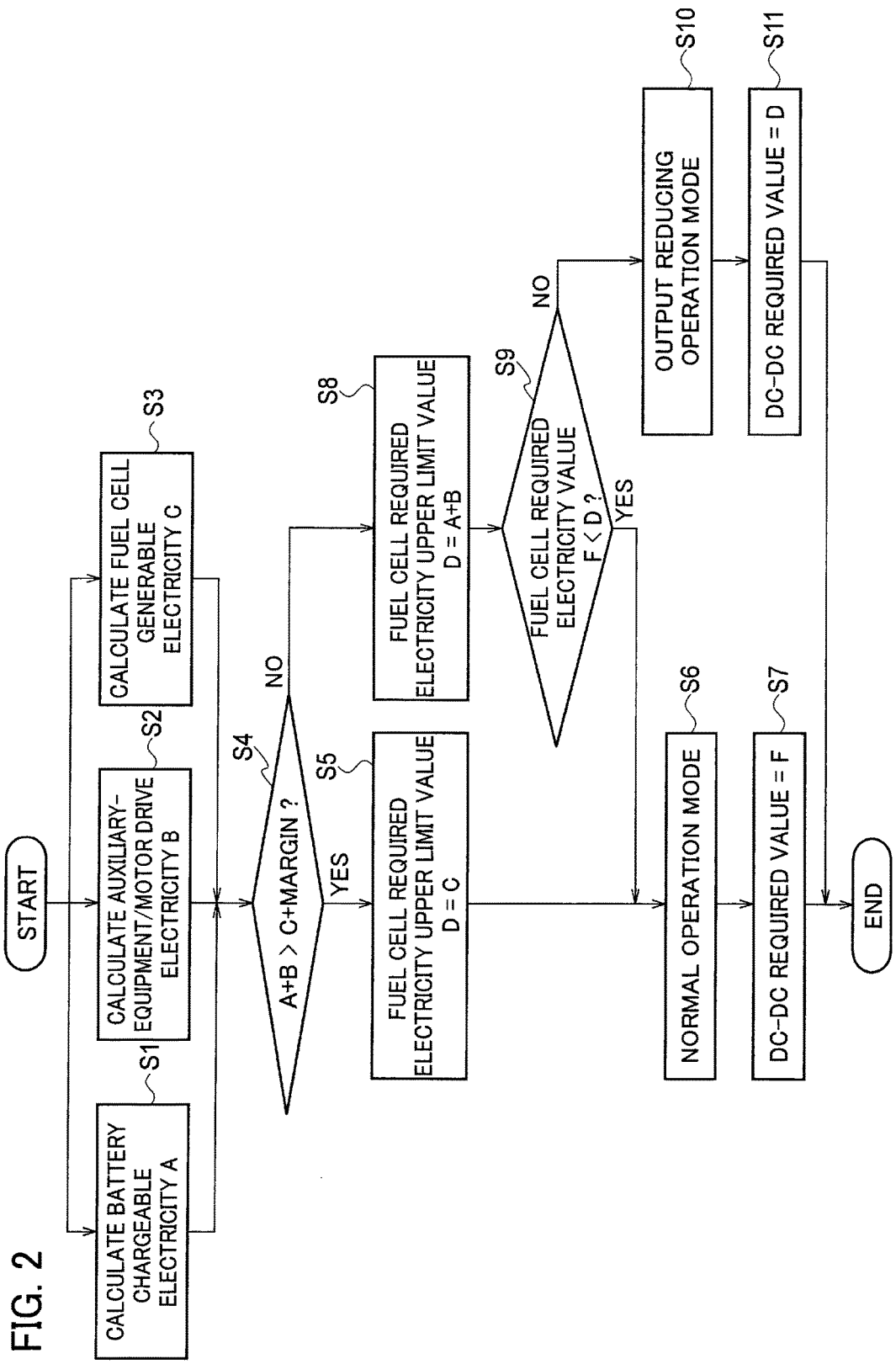
FIG. 2 is a flowchart showing operation processes of a control method by a vehicle controller.
Figure 3:
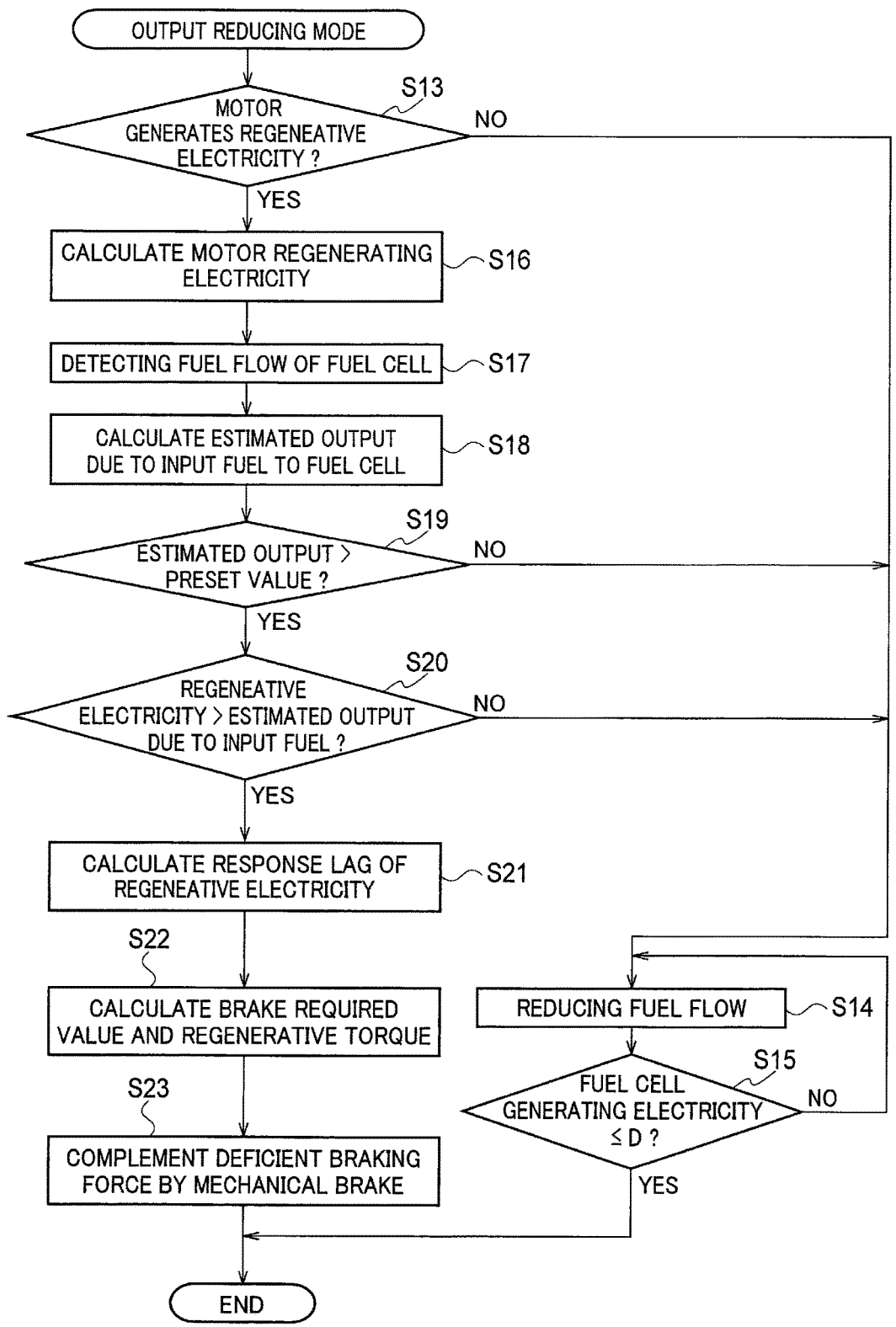
FIG. 3 is a flowchart showing operation processes when a fuel cell enters an output reducing operation mode.

As shown in FIG. 2, current chargeable electricity A of the battery 3 is calculated based on the temperature and the charge level of the battery 3 (step S1), and drive electricity (load electricity) B currently consumed by the load device including the motor 5 and the auxiliary equipment 21 (step S2). The drive electricity for the motor 5 in the drive electricity B includes regenerative electricity generated while braking the vehicle by the brake 19. Further, current generable electricity C of the fuel cell 1 is calculated based on the temperature of the fuel cell 1 (step S3).

Subsequently, it is judged whether or not a combined value [A+B] of the chargeable electricity A of the battery 3 and the drive electricity B for the load device is larger than [the generable electricity C+margin] of the fuel cell 1 (step S4). Here, since the battery 3 won't be overcharged even if the fuel cell 1 generates the generable electricity C in a case where it is judged that [A+B>C+margin] is satisfied, the generable electricity C is set as an upper limit value D of a required electricity for the fuel cell 1 (step S5).

In this case, the fuel cell 1 enters its normal operation mode (step S6), and a required value of output electricity for the DC-DC converter 7 at this time is set as F (step S7).

On the other hand, in a case where it is judged that [A+B>C+margin] is not satisfied in the step S4, i.e. the generable electricity C is not smaller than the combined value of the chargeable electricity A and the drive electricity B as load device electricity, [A+B] is set as an upper limit value D of a required electricity for the fuel cell 1 (step S8). In this case, since the generable electricity C of the fuel cell 1 is large or the above combined value is small and thereby the battery 3 may be overcharged, the upper limit value D is set as [A+B] that is not larger than the generable electricity C.

Subsequently, it is judged whether or not the set upper limit value D=A+B is larger than a required output value F for the fuel cell 1 (step S9). Here, since the battery 3 won't be overcharged in a case where it is judged that the required output value F is smaller than the upper limit value D, the fuel cell 1 enters its normal operation mode in the above-mentioned step S6.

On the other hand, the battery 3 may be overcharged in a case where it is judged that that the required output value F is not smaller than the upper limit value D, and thereby the operation mode of the fuel cell 1 is transferred to its output reducing mode (step S10). Namely, when the required output value F of the output electricity for the DC-DC converter 7 is equal-to or more-than the combined value of the chargeable electricity A of the battery 3 and the drive electricity B for the load device, the battery 3 is preliminarily restricted from being overcharged by reducing the output of the fuel cell 1. The output of the fuel cell 1 is reduced, and thereby a required value of the output electricity for the DC-DC converter 7 is set as the upper limit value D (step S11).

Next, operation processes when the fuel cell 1 enters the output reducing operation mode will be described based on FIG. 3.

In a case where the mode for operating the fuel cell 1 with its output reduced is selected, it is judged whether or not the motor 5 is generating regenerative electricity (step S13). Here, when the motor 5 is driven by electricity supplied from the inverter 9 and thereby doesn't generate regenerative electricity, a supply amount of fuel to the fuel cell 1 is reduced (step S14).

The operation of reducing a supply amount of fuel to the fuel cell 1 is continued until electricity generated by the fuel cell 1 becomes equal-to or lower-than the above-mentioned upper limit value D of the required electricity for the fuel cell 1 (step S15).

On the other hand, when it is judged that the motor 5 is generating regenerative electricity in the step S13, the regenerative electricity by the motor 5 is calculated (step S16) and then an amount of input fuel to the fuel cell 1 is detected by a flow sensor or the like that is not shown in the drawings (step S17).

After the fuel flow is detected, an estimated output of the fuel cell 1 due to the input fuel is calculated (step S18), and then it is judged whether or not the estimated output of the fuel cell 1 is larger than a certain threshold value (preset value, e.g. 20% of a maximum output of the fuel cell 1) (step S19).

Here, when it is judged that the estimated output is not larger than the threshold value, the input amount of fuel to the fuel cell 1 is reduced in the above-described step S14 to restrict electricity generated by the fuel cell 1. By restricting the electricity generated by the fuel cell 1, the battery 3 is restricted from being overcharged.

On the other hand, when the estimated output exceeds the threshold value, it is judged whether or not the regenerative electricity is larger than the estimated output (step S20). Here, when the regenerative electricity is larger than the estimated output, the regenerative electricity is reduced and a filtering process is done so as to make a response lag in the generation of the regenerative electricity (step S21). As result, the battery 3 is preliminarily restricted from being overcharged.

In a case where the filtering process is done for the regenerative electricity, a vehicle brake required value and motor regenerative torque are calculated (step S22), and then a command is sent to the brake controller 23 to complement, by the mechanical brake 19, a braking force deficient due to reduction of the regenerative electricity (step S23).

Note that the regenerative electricity reduces in a case where the filtering process is done for the regenerative electricity, and thereby the upper limit value D of the generable electricity of the fuel cell 1 increases for that. Therefore, a reduced margin of an input amount of fuel to the fuel cell 1 gets smaller at that time.

In the present embodiment, it is preliminarily confirmed that the generable electricity C of the fuel cell 1 is not smaller than the combined value of the chargeable electricity A of the battery 3 and the drive electricity for the motor 5 and the auxiliary equipment 21, and thereby the output of the fuel cell 1 is reduced by the DC-DC converter 7. Therefore, the battery 3 can be restricted from being transiently overcharged before being affected by the motor 5 and the auxiliary equipment 21 that serve as the load device.

In addition, in the present embodiment, the load device is at least one of the motor 5 for driving the vehicle and the auxiliary equipment 21 mounded on the vehicle. Therefore, before being affected by the load(s) due to not only the motor 5 but due to the auxiliary equipment 21, the battery 3 can be restricted from being transiently overcharged by reducing the output of the fuel cell 1 by the DC-DC converter 7.

Further, in the present embodiment, the vehicle controller 25 reduces fuel being supplied to the fuel cell 1 when reducing the output of the fuel cell 1 by the DC-DC converter 7. The fuel cell 1 reduces its output by the reduction of fuel supplied thereto, and thereby can contribute the restriction of the transient overcharge of the battery 3. At that time, an exhausted amount of reactive gas that has not reacted reduces.

Furthermore, in the present embodiment, when it is judged that the motor 5 generates regenerative electricity, the vehicle controller 25 reduces a generated amount of the regenerative electricity according to the reduced amount of fuel of the fuel cell 1. Responsiveness of the fuel flow control for the fuel cell 1 is low, but the output of the fuel cell 1 can be reduced more quickly by the DC-DC converter 7 by reducing an increased margin of the generated amount of the regenerative electricity.

Furthermore, in the present embodiment, the brake 19 for braking the vehicle is provided and, when reducing the generated amount of the regenerative electricity by the motor 5, the controller 25 increases the braking force by the brake 19 according to the reduced amount of the regenerative electricity. Therefore, the generated amount of the regenerative electricity by the motor 5 can be reduced while getting the braking force required for the vehicle by the brake 19.

Figure 4:
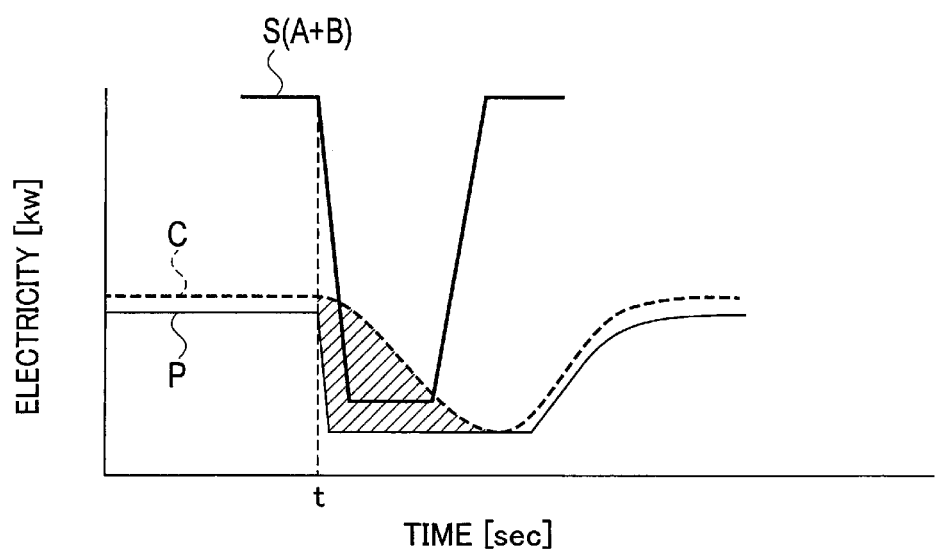
FIG. 4 is a graph showing relations among a combined value of chargeable electricity of a battery and drive electricity for a load device, generable electricity of the fuel cell, and output of the fuel cell.

FIG. 4 shows relations among the combined value S(A+B) of the chargeable electricity A of the battery 3 and the drive electricity B for the load device, the generable electricity C of the fuel cell 1, and the output P of the fuel cell 1.

As shown in FIG. 4, since the regenerative electricity is generated and thereby the battery 3 is charged when the vehicle is braked by an operation of the brake 19 at a time t, the combined value S reduces steeply. The battery 3 can be restricted from being overcharged by reducing the output P of the fuel cell 1 by the DC-DC converter 7 so as to follow the reduction of the combined value S.

At that time, in the fuel cell 1, the generable electricity C due to the input fuel exceeds largely over the output P of the fuel cell 1, and then unreacted fuel corresponding to a hatched area is discharged as it is. A provision for this unreacted fuel will be described hereinafter.

Figure 5:
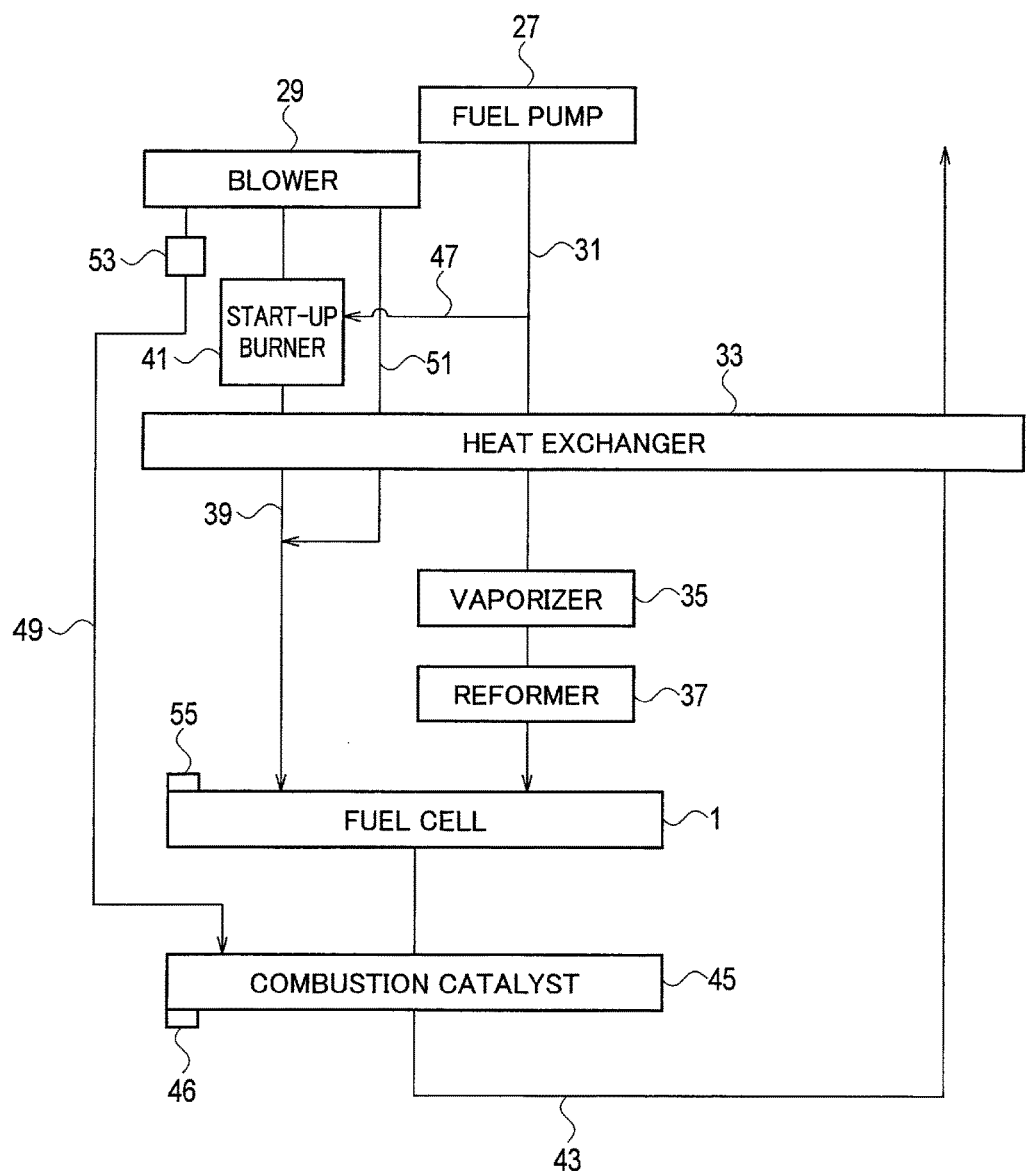
FIG. 5 is an overall configuration diagram of a fuel cell system according to a practical example 1 as a provision against unreacted fuel in the output reducing operation mode.

FIG. 5 is an overall configuration diagram of a fuel cell system showing a practical example 1 as the provision for the unreacted fuel. A fuel cell 1 generates electricity while fuel (e.g. ethanol) is supplied from a fuel pump 27 that configures a fuel supplier thereto and air is supplied from a blower 29 as an air supplier thereto.

On a fuel pipe 31 connecting the fuel pump 27 with the fuel cell 1, a heat exchanger 33, a vaporizer 35 and a reformer 37 are provided in this order from a side of the fuel pump 27. On the other hand, on an air pipe 39 connecting the blower 29 with the fuel cell 1, a start-up burner 41 that serves as a start-up combustor and the heat exchanger 33 are provided in this order from a side of the blower 29. In addition, a combustion catalyst 45 as a combustor is provided on an exhaust pipe 43 downstream from the fuel cell 1. The combustion catalyst 45 is provided with a catalyst temperature sensor 46 as a combustor temperature detector.

The fuel discharged from the fuel pump 27 increases its temperature at the heat exchanger 33 by exchanging heats with the exhaust gas discharged from the combustion catalyst 45, and then vaporizes at the vaporizer 35. The vaporized fuel is reformed into compositions such as $H_2$, $CH_4$ and CO by being decomposed at high temperature by the reformer 37, and then the reformed fuel is supplied to the fuel electrode of the fuel cell 1.

On the other hand, the air blown out from the blower 29 increases its temperature by combustion heats of the start-up burner 41 and further increases its temperature at the heat exchanger 33 by exchanging heats with the exhaust gas discharged from the combustion catalyst 45, and then is supplied to the air electrode of the fuel cell 1. The start-up burner 41 combusts fuel supplied from the fuel pump 27 thereto through the pipe 47 at a start-up of the fuel cell system.

In the fuel cell 1, electricity is generated by ionic conductions between the fuel electrode and the air electrode and then a reacted gas is combusted at the combustion catalyst 45, so that $CO_2$ and $H_2O$ are discharged therefrom and they flow through the heat exchanger 33 while exchanging heats with the fuel and the air.

In addition, the air blown out from the blower 29 is directly supplied to the combustion catalyst 45 through a bypass air pipe 49 in order to cool the combustion catalyst 45 forcibly. After the fuel cell 1 has been started up, the air blown out from the blower 29 flows toward the heat exchanger 33 through the pipe 51 without passing through the start-up burner 41, and then is supplied to the fuel cell 1. An open/close valve 53 as an air flow adjuster is provided on the bypass air pipe 49, and adjusts a flow volume of air directly flowing from the bypass air pipe 49 toward the combustion catalyst 45 among the air blown out from the blower 29.

Next, operations of the practical example 1 will be described.

When the output of the fuel cell 1 is reduced by the DC-DC converter 7 in a case where the fuel cell 1 is transferred to the output reducing operation mode while generating electricity, the fuel already supplied to the heat exchanger 33, the vaporizer 35 and the reformer 37 passes through the fuel cell 1 as being unreacted.

Generally, a capacity of the combustion catalyst 45 is determined so as to process an unreacted gas that has not reacted at the fuel cell 1. Therefore, the fuel to be processed by the combustion catalyst 45 gets excess due to the output reduction of the fuel cell 1 by the DC-Dc converter 7, and thereby the temperature of the combustion catalyst 45 gets higher.

Therefore, in the practical example 1, in order to restrict the temperature of the combustion catalyst 45 within a threshold value, the temperature of the combustion catalyst 45 is detected by the catalyst temperature sensor 46 in the output reducing operation mode, and a supply amount of air by the blower 29 is increased according to increasing of the temperature to cool the combustion catalyst 45 forcibly. As the result, its deterioration can be restricted by restricting the temperature of the combustion catalyst 45 from increasing.

FIG. 6 shows operation processes at that time, and, when the temperature of the combustion catalyst 45 becomes equal-to or higher-than a threshold value (step S71), a flow volume by the blower 29 is made larger (step S72). At that time, the open/close valve 53 may not be provided, or its opening is made constant when being provided.

In addition, in the output reducing operation mode, since a flow volume of air as air-cooling medium increases even though the output of the fuel cell 1 is reduced, the temperature of the fuel cell 1 reduces and thereby its operating efficiency degrades. Therefore, in a case where the temperature of the fuel cell 1 gets lower than a threshold that brings reduction of operating efficiency, the opening of the open/close valve 53 is made larger. As the result, the air blown out from the blower 29 flows more to the combustion catalyst 45 and less to the fuel cell 1.

In this case, a fuel cell temperature sensor 55 as a fuel cell temperature detector is provided in the fuel cell 1, and then the opening of the open/close valve 53 is adjusted based on detected temperature by the fuel cell temperature sensor 55. Namely, the opening of the open/close valve 53 is made larger as the detected temperature by the fuel cell temperature sensor 55 reduces, and thereby an amount of the air blown out from the blower 29 is adjusted so as to be distributed less to the fuel cell 1 and more to the combustion catalyst 45. At that time, a blown-out amount of the air from the blower 29 is regarded as being constant.

FIG. 7 shows operation processes at that time, and, when the temperature of the fuel cell 1 becomes equal-to or lower-than a threshold value (step S81), the opening of the open/close valve 53 is made larger (step S82). Therefore, the air amount to the fuel cell 1 reduces and then its temperature is restricted from reducing and the air amount to the combustion catalyst 45 increases and then its temperature is restricted from increasing, so that both temperatures of the fuel cell 1 and the combustion catalyst 45 can be maintained within a designed value (threshold value).

As described above, even if a large amount of unreacted fuel is generated from the fuel cell 1 in the output reducing operation mode of the fuel cell 1, the large amount of unreacted gas can be combusted at the combustion catalyst 45 efficiently while restricting the temperature increase of the combustion catalyst 45 and the temperature decrease of the fuel cell 1.

Figure 8:
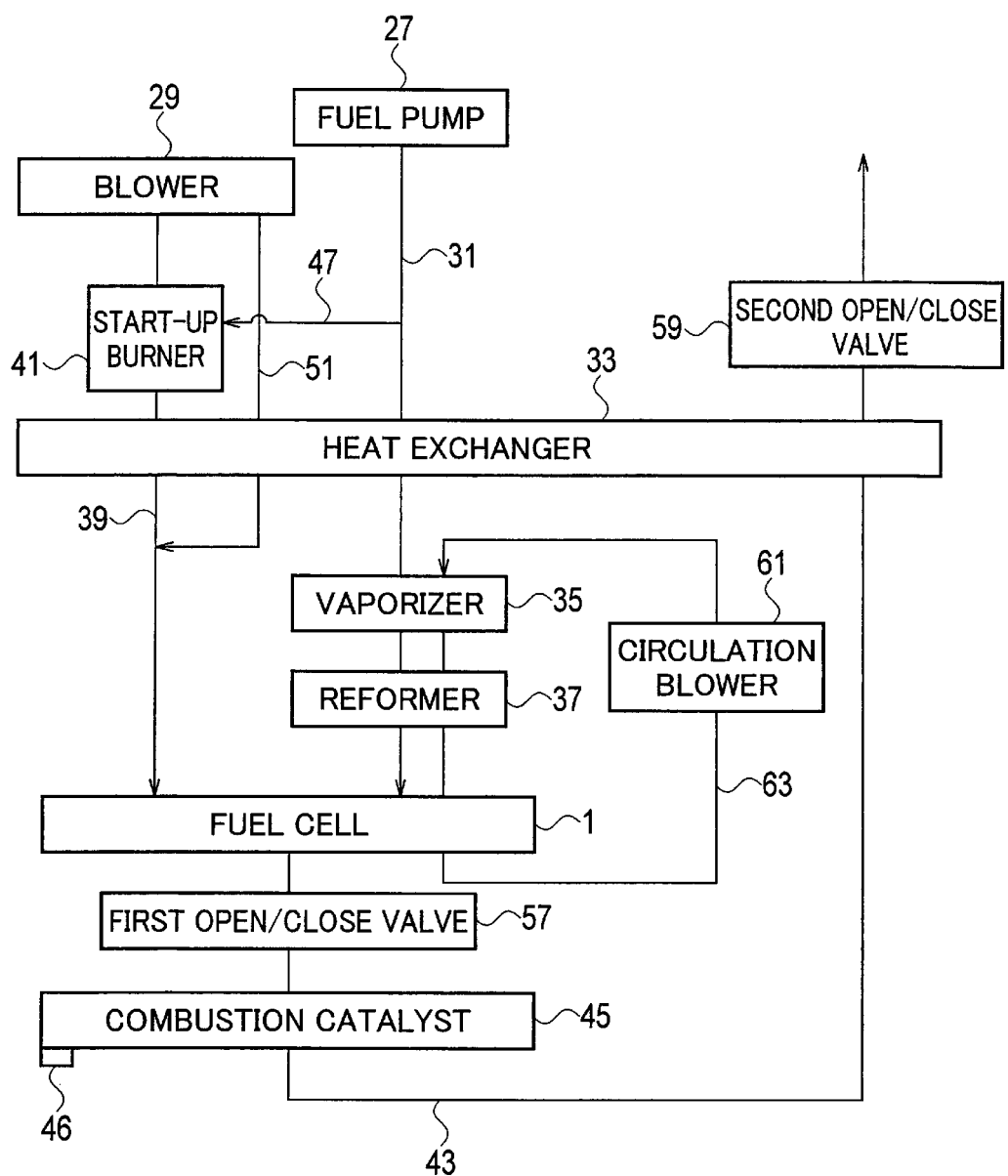
FIG. 8 is an overall configuration diagram of a fuel cell system according to a practical example 2 as a provision against unreacted fuel in the output reducing operation mode.

FIG. 8 is an overall configuration diagram of a fuel cell system according to a practical example 2 as a provision against the unreacted fuel. Fundamental configurational elements as the fuel cell system in the practical example 2 are similar to those in the practical example 1 in FIG. 5. In the practical example 2, a first open/close valve 57, a second open/close valve 59 and a circulation blower 61 are provided instead of the bypass air pipe 49 and the open/close valve 53 in the practical example 1. The first open/close valve 57 and the second open/close valve 59 configure a fuel flow adjuster.

The first open/close valve 57 is provided between the fuel cell 1 and the combustion catalyst 45 on the exhaust pipe 43. The second open/close valve 59 is provided on a portion of the exhaust pipe 43, which discharges exhaust gas to an outside of the system, downstream from the combustion catalyst 45 and the heat exchanger 33. The circulation blower 61 is provided on a circulation pipe 63 that circulates unreacted fuel, discharged from the fuel cell 1, to the vaporizer 35. The circulation pipe 63 connects the vaporizer 35, the reformer 37 and the fuel cell 1 with each other, and configures a fuel recirculation mechanism together with the circulation blower 61.

Figure 9:
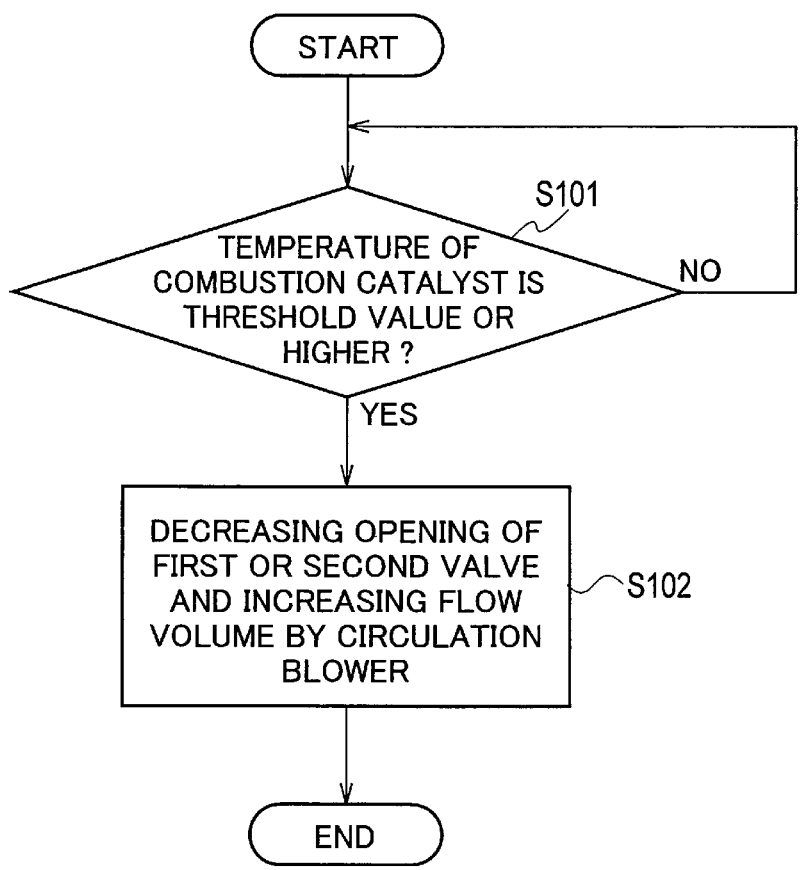
FIG. 9 is a flowchart showing operation processes of the practical example 2 of FIG. 8.

When the output of the fuel cell 1 is reduced by the DC-DC converter 7 in the output reducing operation mode, a large amount of unreacted fuel is discharged from the fuel cell 1 and then combusted at the combustion catalyst 45 as described above. At that time, as shown in FIG. 9, when the temperature of the combustion catalyst 45 detected by the catalyst temperature sensor 46 becomes equal-to or higher-than a threshold value (step S101), an opening of the first open/close valve 57 or the second open/close valve 59 is decreased and concurrently a circulated amount of the unreacted gas by the circulation blower 61 is increased (step S102).

By decreasing the opening of the first open/close valve 57 or the second open/close valve 59, unreacted fuel more than requires is restricted from flowing into the combustion catalyst 45 and thereby the temperature of the combustion catalyst 45 can be restricted from getting high. Along with this, by increasing the circulated amount of the unreacted gas by the circulation blower 61, the unreacted fuel is supplied to the fuel cell 1 again through the vaporizer 35 and the reformer 37, and thereby can be utilized for generation of electricity.

In the practical example 2, the unreacted fuel discharged from the fuel cell 1 is recirculated to the fuel cell 1 by the circulation blower 61 in the output reducing operation mode of the fuel cell 1. Therefore, even if a large amount of unreacted fuel is generated from the fuel cell 1, fuel can be utilized efficiently while restricting the temperature of the combustion catalyst 45 from increasing.

In addition, in the practical example 2, a flow amount of the unreacted fuel flowing into the combustion catalyst 45 is reduced by decreasing the opening of the first open/close valve 57 or the second open/close valve 59. Therefore, even if a large amount of unreacted fuel is generated from the fuel cell 1, fuel can be utilized efficiently while restricting the temperature of the combustion catalyst 45 from increasing more surely.

Note that it may be sufficient that at least one of the first open/close valve 57 or the second open/close valve 59 is provided. However, since temperature of the unreacted fuel at a location just being discharged from the fuel cell 1 is high, almost 800° C., it is preferable to provide the second open/close valve 59 that is located at a low-temperature downstream from the heat exchanger 33 in consideration of valve operability.

Figure 10:
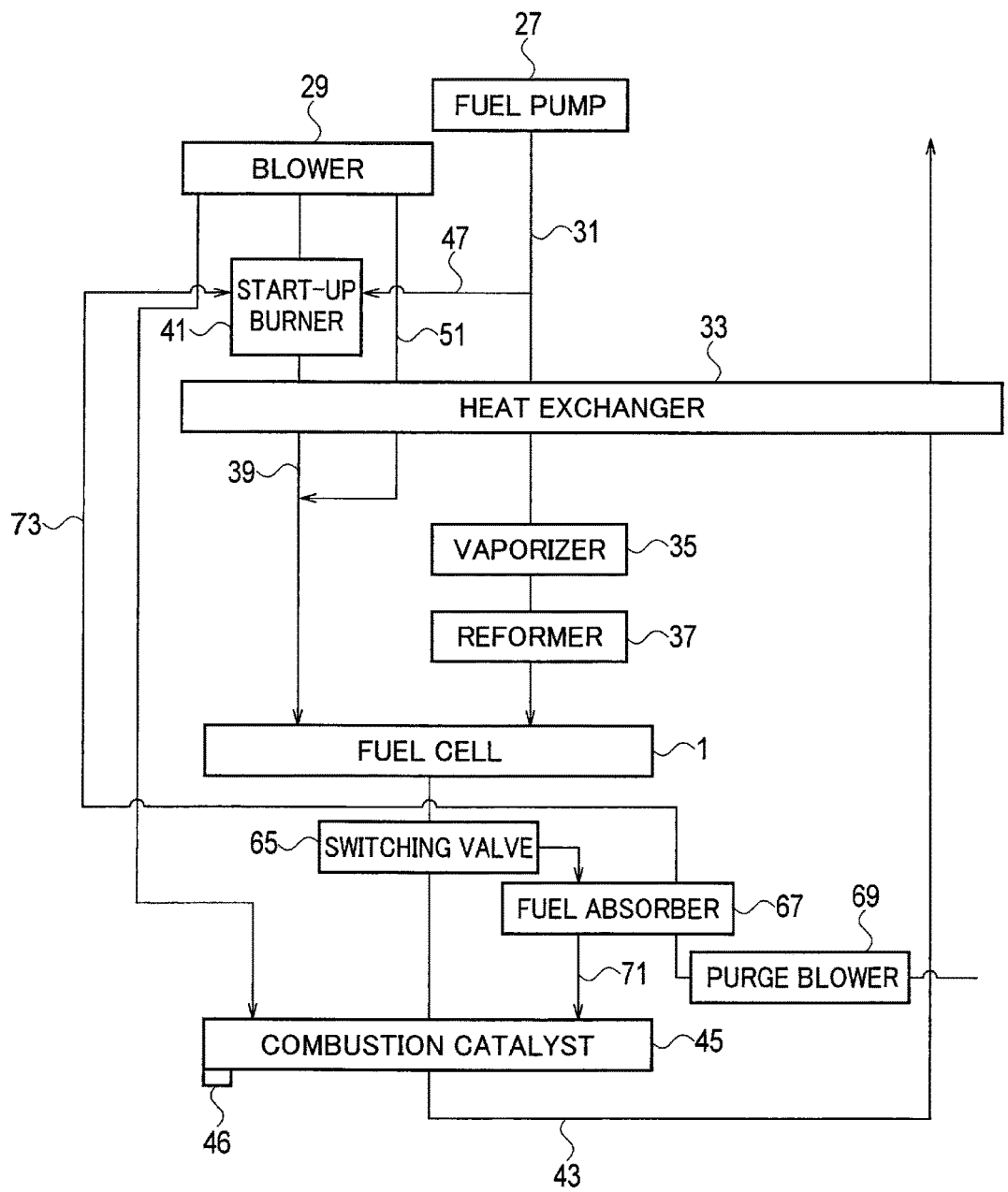
FIG. 10 is an overall configuration diagram of a fuel cell system according to a third practical example as a provision against unreacted fuel in the output reducing operation mode.

FIG. 10 is an overall configuration diagram of a fuel cell system according to a practical example 3 as a provision against the unreacted fuel. Fundamental configurational elements as the fuel cell system in the practical example 3 are similar to those in the practical example 1 in FIG. 5. In the practical example 3, a switching valve 65 as a fuel distributary adjuster, a fuel absorber 67 and a purge blower 69 as a fuel provider are provided in addition to the practical example 1.

The switching valve 65 is provided between the fuel cell 1 and the combustion catalyst 45 on the exhaust pipe 43. The fuel absorber 67 is connected to a bypass pipe 71 connecting the switching valve 65 with the combustion catalyst 45 and also connected to a purge pipe 73 connected with the start-up burner 41. The purge blower 69 is provided on the purge pipe 73 located on an opposite side of the fuel absorber 67 to the start-up burner 41. The fuel absorber 67 is configured as a methane absorber, and is an absorption filter made of activated carbon or porous metallic complex.

Figure 11:
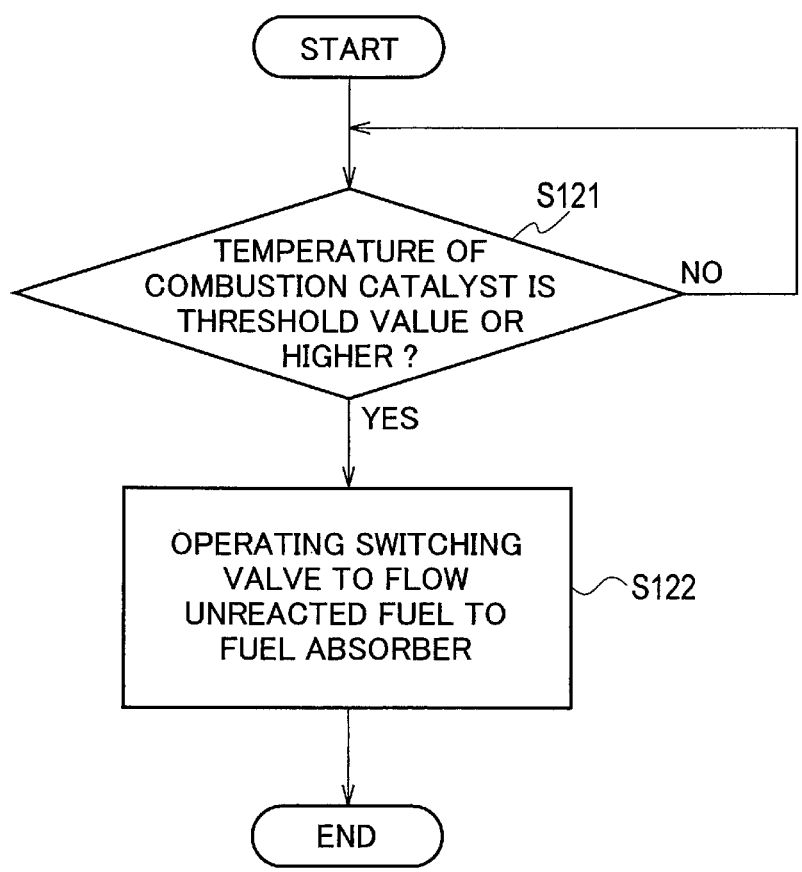
FIG. 11 is a flowchart showing operation processes of the third practical example of FIG. 10.

When the output of the fuel cell 1 is reduced by the DC-DC converter 7 in the output reducing operation mode, a large amount of unreacted fuel is discharged from the fuel cell 1 and then combusted at the combustion catalyst 45 as described above. At that time, as shown in FIG. 11, when the temperature of the combustion catalyst 45 detected by the catalyst temperature sensor 46 becomes equal-to or higher-than a threshold value (step S121), the switching valve 65 is operated to flow the unreacted fuel to the fuel absorber 67 (step S122). Here, a whole amount of the unreacted fuel may be flown to the fuel absorber 67, or the unreacted fuel may be flown more to the fuel absorber 67 than to the combustion catalyst 45.

Therefore, a part or whole of the unreacted fuel discharged from the fuel cell 1 is absorbed by the fuel absorber 67. The fuel absorbed by the fuel absorber 67 secedes therefrom, and then is combusted at the combustion catalyst 45 to be exhausted. At this time, the purge blower 69 is being stopped.

The purge blower 69 operates at a start-up of the fuel cell system to send air to the fuel absorber 67. Therefore, the fuel absorbed in the fuel absorber 67 secedes therefrom by the air sent thereto, and then sent, as to be combusted, to the start-up burner 41 as an air heater. The unreacted fuel is utilized as fuel for a start-up by being combusted at the start-up burner 41.

In the practical example 3, an amount of the unreacted fuel adjusted by the switching valve 65 is made much for the fuel absorber 67 when the output of the fuel cell 1 is reduced by the DC-DC converter 7. Therefore, the unreacted fuel flowing into the combustion catalyst 45 is made reduced, and thereby the temperature of the combustion catalyst 45 can be restricted from getting high.

In addition, in the practical example 3, since the fuel absorbed in the fuel absorber 67 is sent to the start-up burner 41 by the purge blower 69 to be utilized as fuel for a start-up, fuel can be utilized efficiently and can contribute to improvement of fuel consumption.

Figure 12:
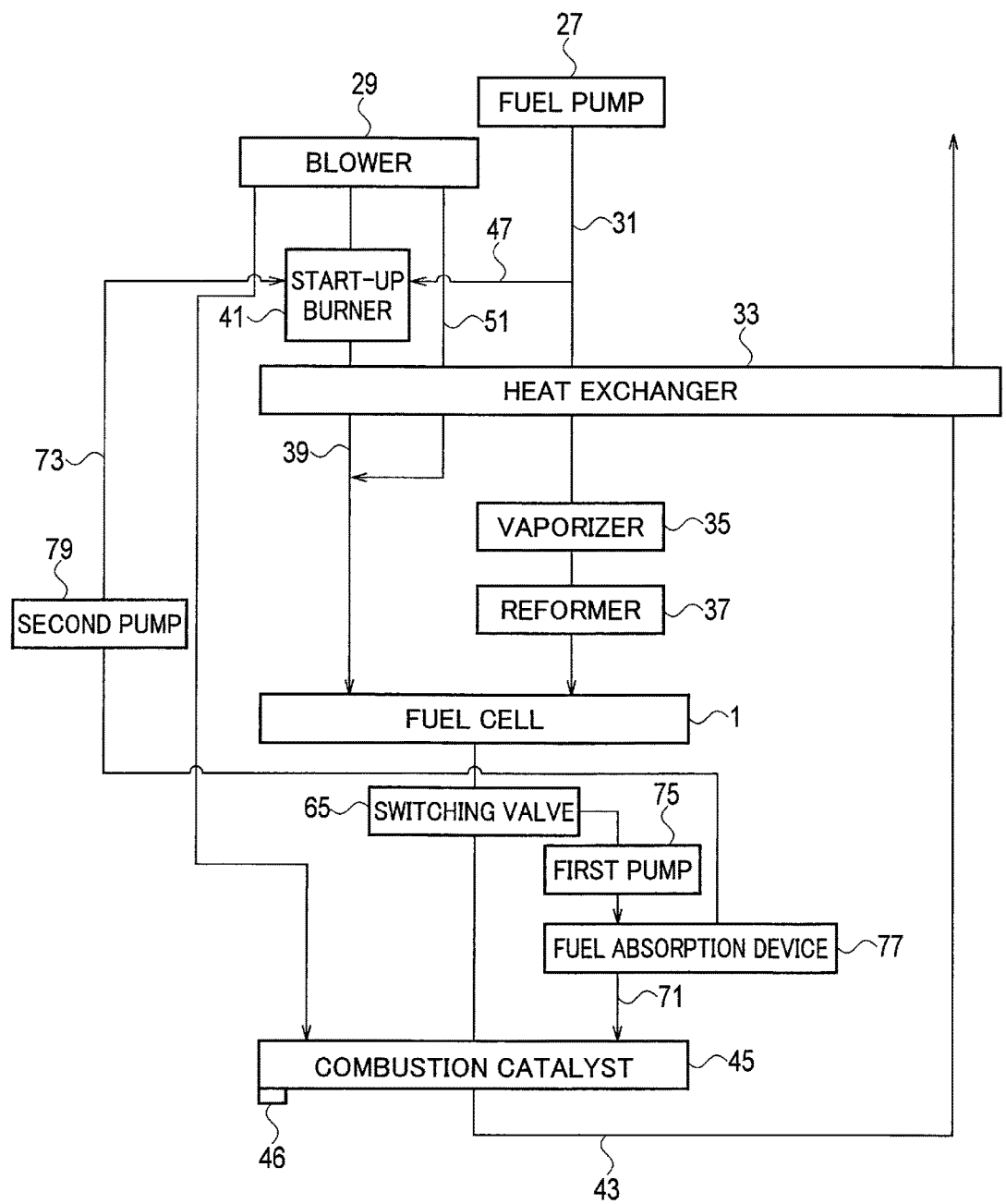
FIG. 12 is an overall configuration diagram of a fuel cell system according to a fourth practical example as a provision against unreacted fuel in the output reducing operation mode.

FIG. 12 is an overall configuration diagram of a fuel cell system according to a practical example 4 as a provision against the unreacted fuel. Fundamental configurational elements as the fuel cell system in the practical example 4 are similar to those in the practical example 1 in FIG. 5. In the practical example 4, in comparison with the practical example 3, a first pump 75 and a fuel absorption device 77 are provided instead of the fuel absorber 67, and a second pump 79 as a fuel provider is provided instead of the purge blower 69.

The fuel absorption device 77 is configured of a low-pressure tank that includes, in an inside thereof, an absorption filter made of activated carbon or porous metallic complex similarly to the fuel absorber 67.

Figure 13:
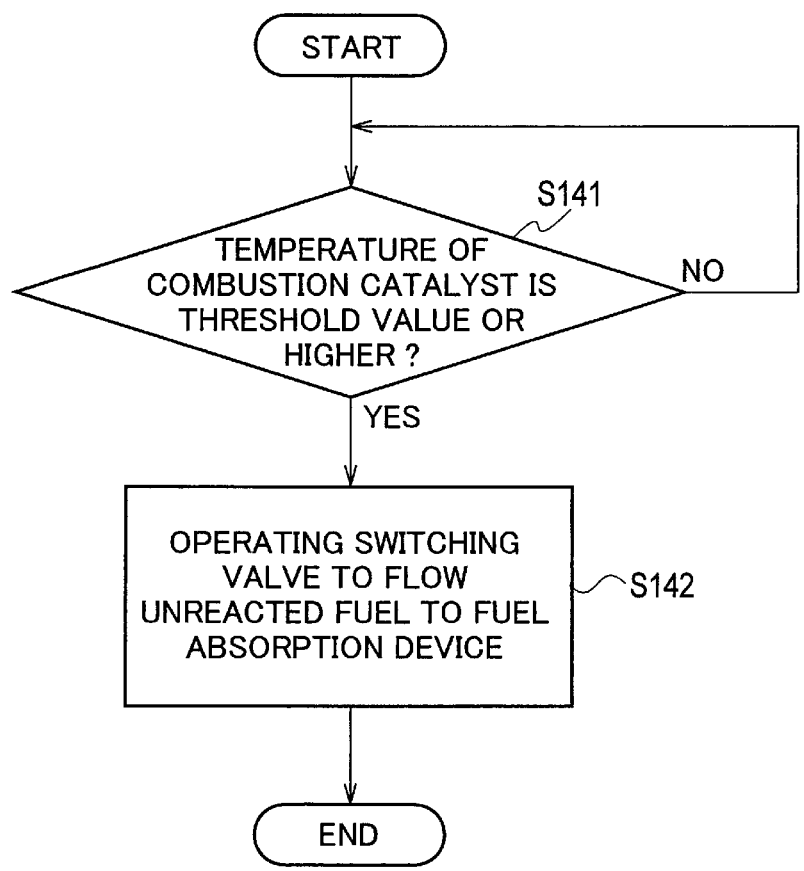
FIG. 13 is a flowchart showing operation processes of the fourth practical example of FIG. 12.

When the output of the fuel cell 1 is reduced by the DC-DC converter 7 in the output reducing operation mode, a large amount of unreacted fuel is discharged from the fuel cell 1 and then combusted at the combustion catalyst 45 as described above. At that time, as shown in FIG. 13, when the temperature of the combustion catalyst 45 detected by the catalyst temperature sensor 46 becomes equal-to or higher-than a threshold value (step S141), the switching valve 65 is operated to flow the unreacted fuel to the fuel absorption device 77 (step S142). Here, a whole amount of the unreacted fuel may be flown to the fuel absorption device 77, or the unreacted fuel may be flown more to the fuel absorption device 77 than to the combustion catalyst 45.

The unreacted fuel flowing into the fuel absorption device 77 is absorbed by the absorption filter in its inside. Therefore, a part or whole of the unreacted fuel discharged from the fuel cell 1 is accommodated/held by the fuel absorption device 77. The fuel accommodated/held by the fuel absorption device 77 is combusted at the combustion catalyst 45 and then exhausted. At this time, the second pump 79 is being stopped.

The second pump 79 operates at a start-up of the fuel cell system to send the fuel accommodated/held by the fuel absorption device 77 to the start-up burner 41. The unreacted fuel is utilized as fuel for a start-up by being combusted at the start-up burner 41.

In the practical example 4, since the fuel accommodated/held by the fuel absorption device 77 is sent to the start-up burner 41 by the second pump 79 to be utilized as fuel for a start-up, fuel can be utilized efficiently and can contribute to improvement of fuel consumption.

The embodiments of the present invention are described above, but these embodiments are mere examples described to make the present invention easily understood, and the present invention is not limited to the above embodiments. The technical scope of the present invention is not limited to specific technical matters disclosed in the above embodi-

INDUSTRIAL APPLICABILITY

The present invention is applied to a control device for a fuel cell vehicle that includes an electricity converter for controlling an output of a fuel cell, a battery for storing electricity of the fuel cell, and a load device operated by electricity of the fuel cell.

REFERENCE SIGNS LIST 1 fuel cell
3 battery
5 motor (load device)
7 DC-DC converter (electricity converter)
19 brake
21 auxiliary equipment (load device)
25 vehicle controller (controller)
27 fuel pump (fuel supplier)
29 blower (air supplier)
41 start-up burner (air heater)
45 combustion catalyst (combustor)
46 catalyst temperature sensor (combustor temperature detector)
53 open/close valve (air flow adjuster)
55 fuel cell temperature sensor (fuel cell temperature detector)
57 first open/close valve (fuel flow adjuster)
59 second open/close valve (fuel flow adjuster)
61 circulation blower (fuel recirculation mechanism)
63 circulation pipe (fuel recirculation mechanism)
65 switching valve (fuel distributary adjuster)
67 fuel absorber
69 purge blower (fuel provider)
77 fuel absorption device (fuel absorber)
79 second pump (fuel provider)

The invention claimed is:

1. A control device for a fuel cell vehicle comprising:
a fuel cell;
an electricity converter that controls an output of the fuel cell;
a battery that stores electricity of the fuel cell;
a load device that operates by electricity of the fuel cell; and
a controller that calculates current chargeable electricity of the battery, load device electricity currently consumed by the load device and current generable electricity of the fuel cell, and reduces the output of the fuel cell by the electricity converter when the generable electricity is equal-to or more-than a combined value of the chargeable electricity and the load device electricity.

2. The control device for a fuel cell vehicle according to claim 1, wherein
the load device is at least one of a motor for driving the vehicle and an auxiliary equipment mounted on the vehicle.

3. The control device for a fuel cell vehicle according to claim 1, wherein
the fuel cell is provided with a fuel supplier that supplies fuel, and
the controller reduces fuel being supplied to the fuel cell by the fuel supplier when reducing the output of the fuel cell by the electricity converter.

4. The control device for a fuel cell vehicle according to claim 3, wherein
the load device includes a motor for driving the vehicle, and
the controller, when judging that the motor generates regenerative electricity, reduces a generated amount of the regenerative electricity according to a reduced amount of the fuel by the fuel supplier.

5. The control device for a fuel cell vehicle according to claim 4, further comprising
a brake for braking the vehicle, wherein
the controller increases a braking force by the brake according to a reduced amount of the regenerative electricity when reducing the generated amount of the regenerative electricity.

6. The control device for a fuel cell vehicle according to claim 1, further comprising
a combustor that combusts fuel discharged from the fuel cell;
an air supplier that supplies air to the fuel cell; and
a combustor temperature detector that detects temperature of the combustor, wherein
the controller increases a supply amount of air by the air supplier according to increasing of the temperature of the combustor detected by the combustor temperature detector when reducing the output of the fuel cell by the electricity converter.

7. The control device for a fuel cell vehicle according to claim 6, further comprising
an air flow adjuster that adjusts an amount of air flowing from the air supplier to the combustor; and
a fuel cell temperature detector that detects temperature of the fuel cell, wherein
the controller adjusts the supply amount of air by the air flow adjuster so as to be distributed less to the fuel cell and more to the combustor according to decreasing of the temperature of the fuel cell detected by the fuel cell temperature detector.

8. The control device for a fuel cell vehicle according to claim 1, further comprising
a fuel recirculation mechanism that recirculates fuel, which is discharged from the fuel cell, to the fuel cell, wherein
the controller increases an amount of fuel recirculated to the fuel cell by the fuel recirculation mechanism when reducing the output of the fuel cell by the electricity converter.

9. The control device for a fuel cell vehicle according to claim 8, further comprising
a combustor that combusts fuel discharged from the fuel cell; and
a fuel flow adjuster that adjusts an amount of fuel flowing from the fuel cell to the combustor, wherein
the controller decreases a fuel flow by the fuel flow adjuster when reducing the output of the fuel cell by the electricity converter.

10. The control device for a fuel cell vehicle according to claim 1, further comprising
a combustor that combusts fuel discharged from the fuel cell;
a fuel absorber that absorbs fuel discharged from the fuel cell; and
a fuel distributary adjuster that adjusts fuel discharged from the fuel cell between an amount thereof flowing to the combustor and an amount thereof flowing to the fuel absorber, wherein the controller increases an amount of the fuel adjusted by the fuel distributary adjuster so as to distribute more to the fuel absorber.

11. The control device for a fuel cell vehicle according to claim 10, further comprising an air heater that heats air being supplied to the fuel cell; and a fuel provider that sends fuel absorbed by the fuel absorber to the air heater as to be combusted.

\* \* \* \* \*